(12) United States Patent
Chin et al.

(10) Patent No.: US 8,377,405 B2
(45) Date of Patent: Feb. 19, 2013

(54) PROCESS FOR PRODUCTION OF A BOROHYDRIDE COMPOUND

(75) Inventors: Arthur Achhing Chin, Cherry Hill, NJ (US); Puja Jain, Blue Bell, PA (US); Suzanne Linehan, Groveland, MA (US); Francis Joseph Lipiecki, Haddonfield, NJ (US); Stephen Gerard Maroldo, Ambler, PA (US); Samuel J. November, Newtown, PA (US); John Hiroshi Yamamoto, New Britain, PA (US)

(73) Assignee: Rohm and Haas Company, Philadelphia, PA (US)

( * ) Notice: Subject to any disclaimer, the term of this patent is extended or adjusted under 35 U.S.C. 154(b) by 702 days.

(21) Appl. No.: 12/322,567

(22) Filed: Feb. 3, 2009

(65) Prior Publication Data

US 2009/0214409 A1 Aug. 27, 2009

Related U.S. Application Data

(60) Provisional application No. 61/067,211, filed on Feb. 26, 2008.

(51) Int. Cl.
*C01B 6/11* (2006.01)
(52) U.S. Cl. ..................................... 423/288
(58) Field of Classification Search .................. 423/286, 423/288; 252/188.26, 188.27; 556/176; 544/225
See application file for complete search history.

(56) References Cited

U.S. PATENT DOCUMENTS

| | | | |
|---|---|---|---|
| 3,159,626 A | | 12/1964 | Ashby |
| 3,344,079 A | * | 9/1967 | Ashby ................. 252/188.27 |
| 3,651,064 A | * | 3/1972 | Nelson ......................... 546/2 |
| 2005/0207959 A1 | * | 9/2005 | Zhou ........................... 423/286 |
| 2005/0226801 A1 | * | 10/2005 | Chin ............................ 423/286 |
| 2005/0255024 A1 | | 11/2005 | Ramachandran et al. |
| 2009/0026416 A1 | | 1/2009 | Zhou |

FOREIGN PATENT DOCUMENTS

| | | |
|---|---|---|
| EP | 1452482 | 9/2004 |
| JP | 2208218 | 8/1990 |

OTHER PUBLICATIONS

Kojima et al. "Recycling process of sodium metaborate to sodium borohydride", 2003, International Journal of Hydrogen Energy, 28, p. 989-993.*
Li et al. "Protide compounds in hydrogen storage systems" 2003, Journal of Alloys and compounds, vol. 356-357, p. 469-474.*
Liu, et al., "Sodium Borohydride Synthesis by Reaction of Na2O Contained Sodium Borate with Al and Hydrogen", Energy and Fules, vol. 21, pp. 1707-1711, (2007).
Graetz, et al., Direct Hydrogenation of Aluminum at Low Pressure, Chem. Soc. Div. Fuel Chem., vol. 52, (2), pp. 447-448 (2007).
Ashby, et al., "The Direct Synthesis of Amine Alanes", J. Am. Chem. Soc., vol. 86, 3407, pp. 1882-1883 (1962).
Graetz, et al., "Direct and Reversible Synthesis of AlH3—Triethylenediamine from Al and H2", J. Phys. Chem. vol. 111, pp. 19148-19152 (2007).
Ashby, "Reactions of Complex Metal Hydrides with Borate Esters", J. Organomettalic Chem., vol. 3, pp. 371-381 (1965).
Keller, "The Reaction of Diborane with Trimethylamine-Alane and Dimethylaminoalane", Inorganic Chemistry, vol. 11, No. 2, pp. 256-258 (1972).

* cited by examiner

*Primary Examiner* — Wayne Langel
*Assistant Examiner* — Syed Iqbal
(74) *Attorney, Agent, or Firm* — Kenneth Crimaldi

(57) ABSTRACT

A process for production of a borohydride compound. The process comprises combining a compound comprising boron and oxygen with an adduct of alane.

11 Claims, No Drawings

PROCESS FOR PRODUCTION OF A BOROHYDRIDE COMPOUND

This application claims the benefit of priority under 35 U.S.C.§119(e) of U.S. Provisional Patent Application No. 61/067,211 filed on Feb. 26, 2008.

This invention was made with Government support under Contract No. DE-FC36-05GO15053 awarded by the Department of Energy. The Government has certain rights in this invention.

BACKGROUND

This invention relates generally to a process for production of a borohydride compound from boron-containing salts and aluminum complexes with Lewis bases.

Production of sodium borohydride from borate salts, aluminum and hydrogen is described in U.S. Pub. Appl. No. 2005/0207959. However, this reaction provides low yields and slow reaction rates.

The problem addressed by this invention is to find an efficient and economical process for production of a borohydride compound from boron-containing salts.

STATEMENT OF INVENTION

The present invention is directed to a process for production of a borohydride compound by combining a compound comprising boron and oxygen with an adduct of alane and a Lewis base.

The present invention is further directed to the process for production of a borohydride compound in which the adduct of alane and a Lewis base is believed to be formed in situ. The process comprises combining a compound comprising boron and oxygen with aluminum, hydrogen and a Lewis base selected from the group consisting of tertiary amines, tertiary phosphines, thioethers and ethers.

DETAILED DESCRIPTION

All percentages are weight percentages ("wt %") based on the entire composition described, unless specified otherwise. A "transition metal" is any element having atomic number 21-30, 39-48, 57, 72-80 or 89. A "compound comprising boron and oxygen" preferably is a compound having at least one oxygen atom per boron atom, e.g., trialkyl borates, boric oxide, boric acid and salts containing a complex anion of boron, preferably a complex anion containing only boron and oxygen. In some embodiments of the invention, the compound has at least two oxygen atoms per boron atom. In some embodiments of the invention, the compound is a boron-containing salt, e.g., an acid or salt containing a $B_4O_7^{-2}$ or $BO_2^{-1}$ ion, preferably the sodium salt. A "borohydride compound" is one containing the borohydride ion, $BH_4^-$. Preferably, the borohydride compound is sodium, potassium or calcium borohydride; most preferably sodium borohydride; and most preferably the boron-containing salt is a sodium salt. If a sodium salt of a boron compound having unequal molar amounts of sodium and boron, e.g., $Na_2B_4O_7$ is used as the boron-containing salt, a sodium-containing base, preferably sodium hydroxide, sodium methoxide, sodium carbonate, sodium oxide or sodium hydride is added to provide the preferred Na:B molar ratio of 1:1. "Alane" is aluminum hydride.

An "ionic liquid" is an organic salt comprising a cation and an anion. Typical cations include ammonium salts formed from amines, guanidines, ureas and thioureas; and also phosphonium salts. Examples include substituted imidazoliums, substituted pyridiniums, substituted pyrrolidiniums, tetraalkyl phosphoniums, tetraalkyl ammoniums, guanidiniums, uroniums and thiouroniums. Typical anions include halides, pseudohalides, alkyl sulfates, alkyl sulfonates, tosylates, imides and amides, borates, phosphates and phosphonates, alkyl carboxylates, triflates and trifluoroacetates.

In some embodiments of the invention, a solvent is used to separate the borohydride product. Suitable solvents are those in which the borohydride compound is soluble and which are relatively unreactive with borohydride, and with the alane. A solvent in which the borohydride compound is soluble is one in which the borohydride compound is soluble at 25° C. at least at the level of 2%, preferably, at least 5%. Preferred solvents include liquid ammonia, alkyl amines, heterocyclic amines, alkanolamines, alkylene diamines, glycol ethers, amide solvents (e.g., heterocyclic amides and aliphatic amides), dimethyl sulfoxide and combinations thereof. Preferably, the solvent is substantially free of water, e.g., it has a water content less than 0.5%, more preferably less than 0.2%; with the exception that concentrated (30-45%) aqueous alkali metal hydroxide solution may be used due to the known stability of borohydrides in this medium, e.g., sodium or potassium hydroxide at approximately 40%. Especially preferred solvents include ammonia, $C_1$-$C_4$ alkyl amines, pyridine, 1-methyl-2-pyrrolidone, 2-aminoethanol, ethylene diamine, ethylene glycol dimethyl ether, diethylene glycol dimethyl ether, triethylene glycol dimethyl ether, tetraethylene glycol dimethyl ether, dimethylformamide, dimethylacetamide, dimethylsulfoxide and combinations thereof. Preferably, the alumina produced in the reaction is substantially insoluble in the solvent. Preferably, the solubility of the alumina is less than 0.1%. The solvent can be recycled after crystallization of the borohydride.

Use of a solvent during the reaction allows the reaction to be run more easily as a continuous process. Moreover, the solvent facilitates heat transfer, thereby minimizing hot spots and allowing better temperature control. Recycle of the solvent is possible to improve process economics. Examples of solvents suitable for use during the process include the Lewis bases; alkanes and cycloalkanes, especially $C_8$-$C_{12}$ alkanes and cycloalkanes; ionic liquids; liquid crown ethers; and for lower-temperature reaction conditions, toluene, glymes and ethers. The Lewis base released from the alane adduct may also act as a solvent during the reaction. Suitable reaction solvents are those in which the borohydride compound is soluble and which are relatively unreactive with borohydride, and with the alane. The reaction solvent may be the same as the solvent used for separation of the borohydride product. The solvent may be recycled after separation from the products of the reaction. If the solvent is a Lewis base, it may be recycled to the reactor, or to another reactor in which the alane adduct is formed, or a combination thereof. If the Lewis base or the alane adduct is a solid, a solvent may be used to facilitate transfer to the reactor. This solvent typically meets the criteria for a solvent used during the reaction, and also may be recycled to the reactor, to an alane adduct reactor (either as a reactant if a Lewis base, or to transfer the product) or a combination thereof.

The method of this invention uses either an adduct of alane and a Lewis base, or a mixture of aluminum, hydrogen and a Lewis base. A Lewis base preferably is an amine, a tertiary phosphine, a thioether, an ether or a combination thereof. In some embodiments of the invention, the amine is a tertiary amine, preferably one having from one to 18 carbon atoms, alternatively from one to eight carbon atoms. Tertiary amines include tertiary alkyl amines, cyclic tertiary amines and aromatic amines. In some embodiments of the invention, the tertiary amines are $C_3$-$C_{12}$ tertiary amines, alternatively $C_3$-$C_6$. In some embodiments, the amines are cyclic amines, preferably $C_3$-$C_{10}$ cyclic amines, alternatively $C_5$-$C_8$ cyclic amines. In some embodiments, the cyclic amines are tertiary amines; in the case of completely or partially saturated cyclic amines, $C_1$-$C_4$ alkyl groups are substituted on primary or secondary amine nitrogen atoms in the cyclic amine. In some embodiments, the tertiary phosphines are $C_3$-$C_{18}$ tertiary phosphines, alternatively $C_3$-$C_9$. In some embodiments, the Lewis base is a saturated compound. In some embodiments, the Lewis base is sterically hindered, e.g., a tertiary amine having at least one tertiary alkyl substituent. The reaction is illustrated below for embodiments in which the Lewis base is a tertiary aliphatic amine and the boron salt is sodium metaborate:

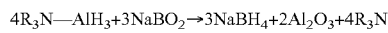

$$4R_3N\text{---}AlH_3 + 3NaBO_2 \rightarrow 3NaBH_4 + 2Al_2O_3 + 4R_3N$$

The alkyl groups on the tertiary alkyl amine may be the same or different. The tertiary alkyl amine may be a cyclic tertiary amine, e.g., quinuclidine, 1,4-diazabicyclo [2.2.2]octane (TEDA, DABCO), an N-alkyl morpholine, or tetramethylcyclam. Thioethers, ethers and tertiary phosphines used herein as Lewis bases also may be cyclic or acyclic, and may contain substituents that are the same or different.

Grinding of the reactants will accelerate the reaction, and may be achieved using any method which applies energy to solid particles to induce a mechanochemical reaction, especially any method which reduces solids to the micron size range, preferably the sub-micron size range, and continually exposes fresh surfaces for reaction, e.g., impact, jet or attrition milling. Preferred methods include ball milling, vibratory (including ultrasonic) milling, air classifying milling, universal/pin milling, jet (including spiral and fluidized jet) milling, rotor milling, pearl milling. Especially preferred methods are planetary ball milling, centrifugal ball milling, and similar types of high kinetic energy rotary ball milling. Preferably, milling is performed in either a hydrogen atmosphere, or an inert atmosphere, e.g., nitrogen. In an embodiment in which a solvent is used, grinding of the reactants may be achieved using any method suitable for grinding a slurry.

Another method to accelerate the reaction is to use radiation techniques alone or in combination with reactive milling. For example, microwave irradiation can direct energy at specific reaction surfaces to provide rapid heating and deep energy penetration of the reactants. Microwave absorbers such as metal powders, which could be used as milling media, and dipolar organic liquids may also be added to the reaction system to promote the reaction. The advantage of these techniques is that high reaction rates may occur at considerably lower processing temperature than could be obtained with resistive heating thermal techniques.

In one embodiment of the invention in which the boron-containing salt is combined with aluminum and a Lewis base, hydrogen gas is necessary, as shown in the equations provided below.

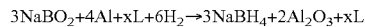

$$3NaBO_2 + 4Al + xL + 6H_2 \rightarrow 3NaBH_4 + 2Al_2O_3 + xL$$

In this embodiment, the pressure of hydrogen preferably is from 100 kPa to 10,000 kPa.

Without being bound by theory, it is believed that methods allowing use of a lower reaction temperature are beneficial. Preferably, the reaction temperature is less than 250° C., and more preferably less than 150° C. when the grinding is carried out without a solvent. When a solvent is used, the preferred reaction temperature is below the boiling point of the solvent at the pressure within the grinding equipment. Preferably, the pressure is in the range from 100 kPa to 10,000 kPa, more preferably from 100 kPa to 2000 kPa.

In embodiments in which hydrogen is added, materials that catalyze surface hydride formation from gas phase hydrogen can be used to further hydriding kinetics. Examples of suitable catalysts include powders of the transition metals, and their oxides, preferably La, Sc, Ti, V, Cr, Mn, Fe, Ni, Pd, Pt and Cu; oxides of silicon and aluminum, preferably alumina and silica; and $AB_2$, $AB_5$, AB, and $A_2B$ types of alloys, wherein A and B are transition metals, such as FeTi and $LaNi_5$. A comprehensive list of hydriding alloys is given at the Sandia National Laboratory website at hydpark.ca.sandia.gov/.

After the reaction has proceeded substantially to completion, preferably the borohydride product is separated from the alumina byproduct. In one embodiment in which a solvent is used for the separation, the solvent is separated from the insoluble alumina product and any grinding medium, which also would be insoluble. The borohydride compound can then be separated from the solvent by conventional methods. For example, the borohydride compound-rich solvent can be removed by filtering or using any other conventional solid-liquid separation device such as a centrifuge. The insoluble alumina is collected and dried. High purity borohydride compound can be recovered from the solvent phase by evaporating the solvent or by lowering temperature to crystallize or precipitate the borohydride compound product. The preferred method will depend on the solubility-temperature profile of the solvent selected. Additional solvent washes can be used to improve recovery and purity.

In some embodiments of the invention in which the reaction is carried out in a solvent in which the borohydride product is soluble, a liquid stream can also be withdrawn during the course of the reaction to remove the borohydride compound, and the solvent returned to the reactor to lower the reactor borohydride compound content and drive the reaction further to completion. As such, reactions that may be equilibrium constrained may be enhanced for higher yields. The formation of borohydride is also highly exothermic. By cooling the solvent return stream to the reactor, a means for controlling reaction temperature is also provided. For example, the withdrawn solvent will be at the reactor temperature. If this stream is sufficiently cooled, borohydride compound crystals will form and can be removed using conventional methods as described above. The cooled solvent of lower borohydride compound content is returned to the reactor to maintain reactor temperature at the target condition.

EXAMPLES

Reduction Using Alane Adduct

Studies were made to demonstrate the effectiveness of borate reduction to $NaBH_4$ using alane adducts. These experiments were conducted at ambient temperature (no applied external heat) in a RETSCH PM 100 planetary ball mill using $NaBO_2$ and Alane-TMA (TMA=trimethylamine). Anhydrous $NaBO_2$ was prepared by vacuum drying sodium metaborate hydrate from Aldrich Chemical Co. to achieve ca. 1.5 wt % moisture as determined by TGA. Alane-TMA powder (>95% purity) was obtained from Gelest. and used without further treatment. In each run, 0.32 grams dry $NaBO_2$ powder and 0.19 grams Al-TMA powder were loaded in the mill jar along with 100 grams of 7 mm diameter stainless steel balls, and the mill operated at 500 rpm under $N_2$ inertion for 4 hours. At these weights, alane is added at stoichiometric requirements and not in excess compared to amount of $NaBO_2$ present. Upon termination of each run, tetraglyme (Aldrich 99%) that had been pre-dried with molecular sieve was added to the jar contents to produce a suspension and dissolve any NaBH$_4$ formed. The filtrate was analyzed by $^{11}$B NMR to provide positive identification of NaBH$_4$ as well as determine the absolute NaBH$_4$ content. Borate conversion to borohydride was calculated based on the borate used in the feed, assuming all NaBH$_4$ produced is dissolved in the tetraglyme. The yield of sodium borohydride in two runs was 100% and 86%. These results indicate high effectiveness of alane-TMA to reduce NaBO$_2$ to NaBH$_4$.

Moreover, the borate reduction reaction can be carried out using other alane adducts and in any number of reactor configurations and geometries. It can be in a solid-solid reaction as shown in the Examples (for NaBO$_2$+AlH$_3$-TMA), in a solid-liquid slurry where the reaction occurs in a liquid medium, or in solution form where the borate such as trimethylborate and alane adduct are present as liquids.

Reduction Using Al and H$_2$ Gas

In another series of studies, direct reduction of NaBO$_2$ using Al, H$_2$ gas and borate feed was investigated in a stirred batch autoclave reactor capable of elevated temperature and pressure operations. This apparatus permitted the evaluation of a one-pot synthesis of borate reduction to NaBH$_4$ that may proceed via formation of an alane adduct intermediate at low temperature.

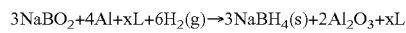

$$3NaBO_2 + 4Al + xL + 6H_2(g) \rightarrow 3NaBH_4(s) + 2Al_2O_3 + xL$$

The autoclave reactor is equipped with a pin agitator that provides a degree of mixing to the powders and 'grinding' balls (3.5 mm chrome steel) charged to the vessel. In one experiment, 0.47 grams Al powder (Aldrich, 99.95+%, <75 microns) and 0.84 grams anhydrous NaBO$_2$ were combined with 2.78 grams of TEDA-triethylene diamine from Aldrich (98%; 1,4-Diazabicyclo[2,2,2]octane) and 0.06 grams TiH$_2$ powder from Aldrich (99%, 325 mesh). All powders with the exception of NaB$_2$ were used as received. TEDA served as the Lewis base to produce AlH$_3$-TEDA and Ti, in the form of TiH$_2$, served as the catalyst. (preferred catalysts include Group IVB or VB metals such as Ti or V.) The reactor was operated for 4 hours at 75 atm (7575 kPa) H$_2$ pressure (Matheson Tri-Gas, 99.95%+ and mole sieve dried) and 194° C. wall temperature using an electrically heated jacket. At the completion of the run and after cooling, tetraglyme was added to dissolve any NaBH$_4$ produced, and the filtrate was analyzed by $^{11}$B NMR, similar to the planetary milling studies. The results indicate 4% conversion to NaBH$_4$.

The invention claimed is:

1. A process for production of a borohydride compound; said process comprising combining a compound comprising boron and oxygen with an adduct of alane and a C$_3$-C$_{12}$ tertiary amine.

2. The process of claim 1 in which the compound comprising boron and oxygen is a compound having at least one oxygen atom per boron atom.

3. The process of claim 2 in which the borohydride compound is sodium borohydride.

4. The process of claim 1 in which the compound comprising boron and oxygen is an acid or salt comprising BO$_2^-$ or B$_4$O$_7^{-2}$.

5. The process of claim 4 in which the acid or salt comprising BO$_2^-$ or B$_4$O$_7^{-2}$ is NaBO$_2$ or Na$_2$B$_4$O$_7$.

6. The process of claim 5 in which the borohydride compound is sodium borohydride and the acid or salt comprising BO$_2^-$ or B$_4$O$_7^{-2}$ is NaBO$_2$.

7. A process for production of a borohydride compound; said process comprising combining an acid or salt comprising BO$_2^-$ or B$_4$O$_7^{-2}$ with aluminum, hydrogen and a C$_3$-C$_{12}$ tertiary amine.

8. The process of claim 7 further comprising a catalyst selected from the group consisting of powders of the transition metals and their oxides; oxides of aluminum and silicon; and alloys of formula AB$_2$, AB$_5$, AB or A$_2$B, wherein A and B are transition metals; and combinations thereof.

9. The process of claim 8 in which the borohydride compound is sodium borohydride.

10. The process of claim 7 in which the acid or salt comprising BO$_2^-$ or B$_4$O$_7^{-2}$ is NaBO$_2$ or Na$_2$B$_4$O$_7$.

11. The process of claim 10 in which the borohydride compound is sodium borohydride and the acid or salt comprising BO$_2^-$ or B$_4$O$_7^{-2}$ is NaBO$_2$.

* * * * *